Dec. 18, 1928.

F. W. MANNING

MAGAZINE FILTER

Filed Oct. 1, 1925      2 Sheets-Sheet 1

1,695,811

INVENTOR.
FRED W. MANNING
BY Dewey, Strong,
Townsend & Loftus
ATTORNEYS.

Dec. 18, 1928.  
F. W. MANNING  
MAGAZINE FILTER  
Filed Oct. 1, 1925   2 Sheets-Sheet 2

1,695,811

INVENTOR.
FRED W. MANNING
BY
ATTORNEYS.

Patented Dec. 18, 1928.

1,695,811

UNITED STATES PATENT OFFICE.

FRED W. MANNING, OF BERKELEY, CALIFORNIA, ASSIGNOR TO STEWART-WARNER SPEEDOMETER CORPORATION, OF CHICAGO, ILLINOIS, A CORPORATION OF VIRGINIA.

MAGAZINE FILTER.

Application filed October 1, 1925. Serial No. 59,787.

This invention relates to certain new and useful improvements in filters for the removal of solids from liquids, but more particularly it relates to the purifying of used oils by clarification, decolorization, or other treatment.

Motor oils and the like very quickly become contaminated with road dust, metal and carbon particles, and other impurities which are often held loosely together by oxidized oil. These impurities not only cause wear to the moving parts of the motor but tend to clog the oil holes, and the abrasive action of these impurities is often accentuated by dilution of the lubricating oil caused by the addition of fuel oil and water—by-products of operating with relatively cold engines. The constant wear on the engine parts due to the contamination of crank case oil of motor cars has been relieved to some extent by the use of various types of pressure filters. However, these have not been found to be very satisfactory, as their filtering fabrics gradually become clogged with impurities, resulting in decreased filtering rates and increased filtering pressures. The ultimate result is usually the replacement of the filter at considerable expense.

As distinguished from prior practice the present invention aims to provide means for maintaining at all times a uniform filtering rate at a constant pressure, to greatly increase the amount of filtering fabric that may be carried particularly in a small filter, and to avoid the expense of filter replacement.

In accordance with my invention the filtering fabric is wound upon a supply spool in the form of a belt, and serves its purpose of collecting and adsorbing the impurities and contaminations from the oil or other liquids while being fed either intermittently or continuously over the sides of one or more movable filtrate receiving members onto a receiver spool.

Further, in accordance with my invention the filtering fabric may be composed of cotton, paper, asbestos, or similar fibrous material impregnated with a granular treating agent such as carbon, bone char, fuller's earth, kieselguhr, or other similar granular materials, or a mixture of them. The impregnation of the fibrous filtering belt may be for the purpose of decolorization, aiding clarification, increasing the filtering rate, the selective adsorption of water, fuel oil and other contaminations from the lubrication oil, and for other purposes. The treating agent may be added to the fibrous pulp when the latter is in a watery stage, mixed thoroughly through it, formed into sheets and dried; or it may be formed into a layer on one side of a layer of fibrous material or into a layer between two layers of fibrous materials and then passed under pressing and drying rolls and all these operations accomplished in the usual "beaters," cylinder paper making and drying machines familiar to those versed in the art of paper and felt manufacture. A binding liquid may be used at any stage of the operations when it is desirable to use such to cause the necessary adhesion between the fibrous and granular materials. Or instead of using a laminated or fibrous sheet impregnated with a treating agent, I may sometimes use a double fold of thin fabric with a layer of granular treating agent between the folds; but whatever method is used, the arrangement must be such that no particles of the treating agent can pass from the filtering fabric into the filtrate. In the case of a sheet including a layer of granular and a layer of fibrous material, the fibrous material when in use would be next to the filtrate side. A fine metallic screen may be incorporated in the sheet to increase its tensile strength.

The features of the invention hereinbefore referred to in general terms will be better understood by reference to the following description, taken in conjunction with the accompanying drawings which illustrate a preferred form of apparatus for carrying out my invention. It will be understood, however, that the construction herein illustrated and described is merely illustrative of how the features of the invention may be employed, and that the drawings are not to be construed as defining or limiting the scope of the invention, the claims appended to this specification being relied upon for that purpose.

Figure 1:
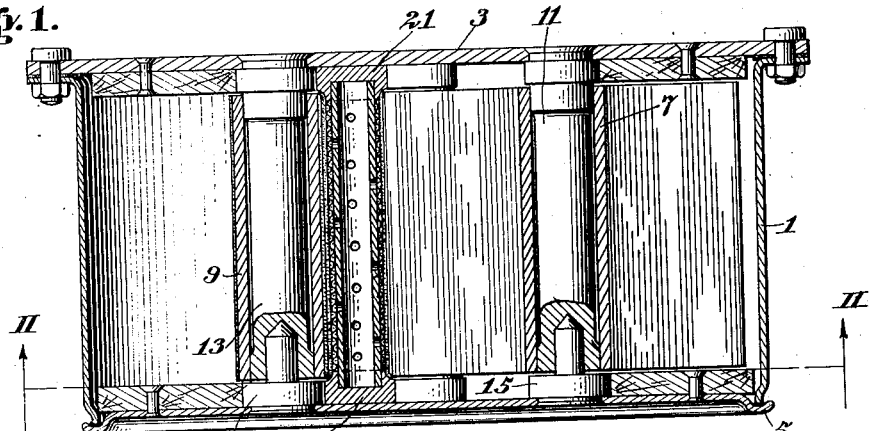
Fig. 1 is a sectional plan view of the apparatus, taken on line I—1 of Fig. 2.

The apparatus as shown consists of sides and front 1, supporting back 3 and door plate 5 forming a closed chamber and all of which may be made from pressed steel plates or other suitable material. Spools 7 and 9 rotate freely on spool pins 11 and 13 respectively, fixed rigidly in the back supporting plate 3, and both pins have their free ends supported by center pins 15 and 17 respectively, riveted to the door plate 5.

The pivoted filtrate receiving member comprises the sides 19 and 21 connected rigidly together by tie bolts 22, filtering fabric guide rollers 23 and 25, end closure 27, and endless flexible drainage member 29 supported by cylindrical rollers 31. The filtering belt is supported and carried by means of the endless drainage member 29, which in turn is driven by the lower cylindrical roller 33, to one end of which drive shaft 35 is fastened, and which is rotated by means not shown. The other end of cylindrical roller 33 rotates freely on the end of filtrate outlet pipe 37. Any oil or liquid passing over this rotating surface and into the filtrate must first pass through the felted washer 39, and is thus filtered.

The operation of the apparatus is as follows:

On removing door plate 5 a supply spool 7, completely wound with a length of filtering fabric of any suitable material, as described in the early part of this specification, is slipped onto pin 11 and the loose end threaded around the pivoted filter member as shown, and attached to empty spool 9. The edges of closure 27 bear against the filtering fabric so as to prevent entrance of the oil into the upper end of the filtrate receiving member. After closing of the door plate 5 the oil to be filtered or otherwise treated, is pumped into the apparatus through connection 49, and on completely filling the chamber passes through the filtering belt and endless drainage member and runs down into and out of the bottom perforated cylindrical roller 33. It is not necessary that those cylindrical rollers above 33 be perforated, as the endless drainage member allows for sufficient downward drainage of the filtrate at the sides of the rollers without its being necessary for the filtrate to pass through the rollers.

Figure 2:
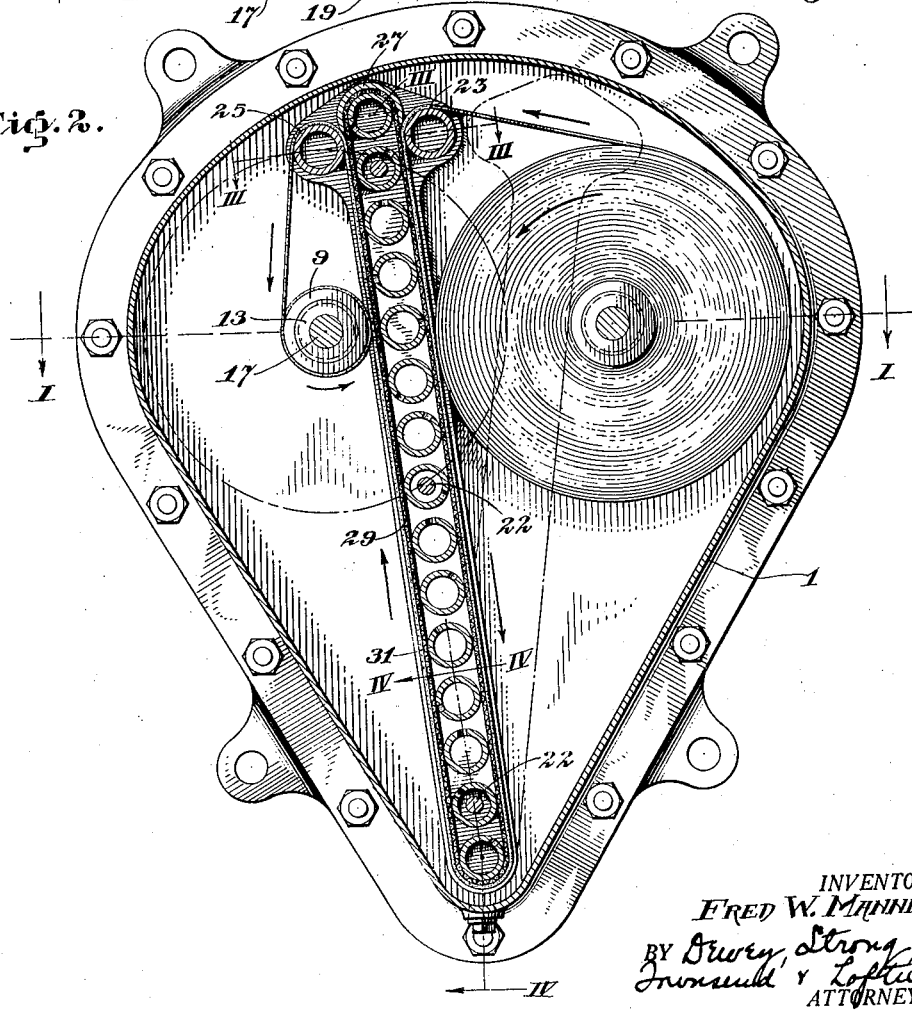
Fig. 2 is a sectional elevation of the apparatus, taken on line II—II of Fig. 1.
Figure 3:
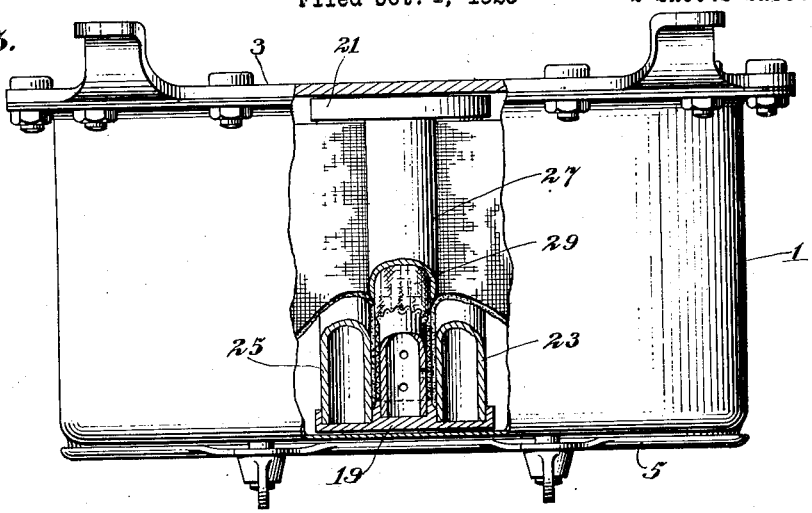
Fig. 3 is a plan view with partial section, taken on line III—III—III of Fig. 2.
Figure 4:
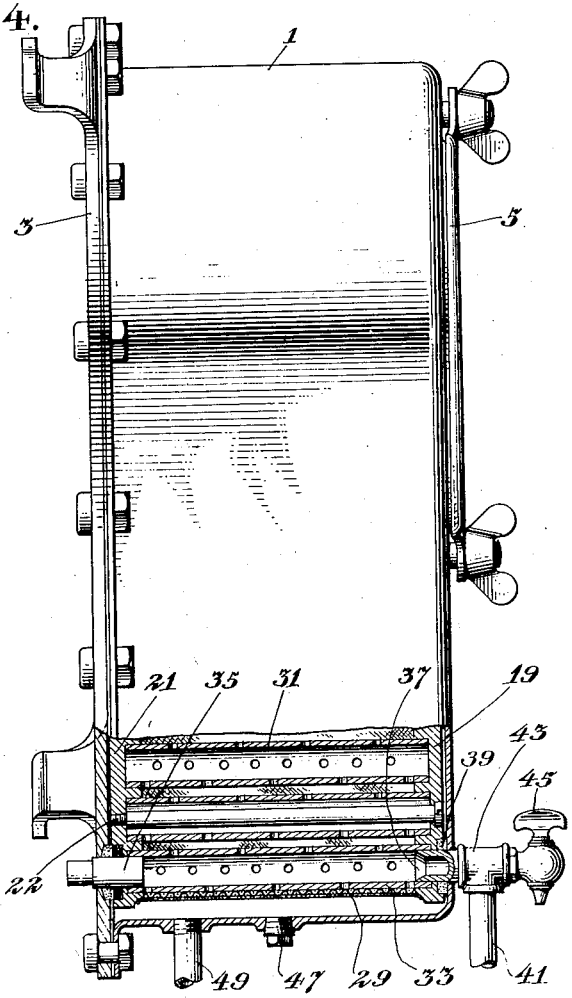
Fig. 4 is a side elevation with partial section, taken through line IV—IV of Fig. 2.

The filtering belt is fed onto the receiver spool 9 either intermittently or at a uniform rate of speed, by means of the endless drainage member 29 driven by lower roller 33 and drive shaft 35, this rate of speed depending upon the impurities to be collected and adsorbed. The filtering belt with these impurities, on being wound onto the receiver spool 9, gradually forces the filtrate receiving member over, until on exhaustion of the supply spool the filter supporting member finally occupies the dotted position shown in Fig. 2. The receiver spool with the impurities and contaminations taken up is then discarded and the empty supply spool is taken off of pin 11, and on being slipped on pin 13 becomes the receiver spool, and the operation is repeated. The supply spool is unwound by means of the pull on the filter belt, and the receiver spool is wound by means of its contact with the filter belt carried by the endless drainage member.

A uniform intermittent movement may be transmitted to drive shaft 35 by connecting it with some moving part of the engine in such a way that the travel of the filtering belt may be made proportional to the speed of the engine. Or, by means of suitable gearing and shafting, the drive shaft 35 may be connected to a small hand-wheel on the dashboard of the car, to enable the operator to move the filtering belt several feet for every one hundred or one thousand miles. Or, a continuous movement may be transmitted by drive shaft 35 by connecting it through a reducing mechanism to any suitable part of the engine or transmission. By so actuating the belt mechanically the filter surface will be constantly renewed and will run off the supply spool when it reaches the end of its length.

Having thus described my invention, what I claim as new and desire to secure by Letters Patent is:

1. In a filter, an enclosed chamber containing a filter wall in the form of a belt, a supply spool and a storage spool for the belt, an endless flexible drainage member forming a support for the belt between said spools, and a frame supporting said drainage member and pivoted to move between and toward and from the spools.

2. In a filter, an enclosed chamber, a pair of rotatable members within the chamber, a filter supporting member of foraminous material in the form of an endless belt encompassing and enclosing space in the chamber partitioned by the belt from the remainder of the chamber cavity, a movable filtering member wound upon one of the rotatable members and extended therefrom over said foraminous belt in contact therewith, and connected to the other rotatable member, means for driving said endless belt adapted to cause it to transfer the filtering member from one rotatable member to the other, said chamber having an intake admitting the liquid to be filtered outside the space enclosed by said foraminous belt support and a discharge means, the discharge means communicating with the chamber from within the endless foraminous belt support, whereby liquid entering the chamber must pass through the filtering member on said belt and through said foraminous belt to reach the discharge means.

3. In the construction defined in claim 2, the endless foraminous belt being mounted for pivoting about an axis near one end for swinging at the other end between the two rotatable members to accommodate the accumulation of the filtering member on the rotatable member onto which it is wound from the other rotatable member.

4. In a filter, an enclosed chamber, a filtering element in the form of a belt; a supply spool and a storage spool for said belt; an endless belt constituting a drainage element; a support for the filter belt in the passage of the latter from one spool to the other, and means for supporting and actuating said drainage belt in its endless path with the filter belt.

FRED W. MANNING.